United States Patent

Coto et al.

(10) Patent No.: US 8,702,904 B2
(45) Date of Patent: Apr. 22, 2014

(54) METHOD AND APPARATUS FOR SEPARATING LAMINATIONS

(75) Inventors: Guillermo Coto, Monroe, CT (US); Richard K. Buckley, Canandaigua, NY (US); Glenn Doud, Livonia, NY (US); Fernando Aguilera Galicia, Reynosa (MX)

(73) Assignee: Branson Ultrasonics Corporation, Danbury, CT (US)

( * ) Notice: Subject to any disclaimer, the term of this patent is extended or adjusted under 35 U.S.C. 154(b) by 0 days.

(21) Appl. No.: 13/366,479

(22) Filed: Feb. 6, 2012

(65) Prior Publication Data

US 2013/0032297 A1 Feb. 7, 2013

Related U.S. Application Data

(60) Provisional application No. 61/440,931, filed on Feb. 9, 2011.

(51) Int. Cl.
*B32B 38/10* (2006.01)

(52) U.S. Cl.
USPC .......................................... 156/705; 156/754

(58) Field of Classification Search
USPC .......................................... 156/70, 705, 754
See application file for complete search history.

(56) References Cited

U.S. PATENT DOCUMENTS

| | | | |
|---|---|---|---|
| 3,401,446 A * | 9/1968 | Obeda et al. | 29/426.5 |
| 5,344,521 A * | 9/1994 | Ohsaki | 156/754 |
| 5,810,156 A | 9/1998 | Siebels | |
| 5,849,091 A * | 12/1998 | Skrovan et al. | 134/1 |
| 6,435,249 B1 * | 8/2002 | Komine et al. | 156/763 |
| 7,719,125 B2 * | 5/2010 | Medding et al. | 257/798 |
| 2002/0157791 A1 * | 10/2002 | Yanagita et al. | 156/344 |
| 2009/0032186 A1 * | 2/2009 | Cheung et al. | 156/344 |
| 2009/0218050 A1 * | 9/2009 | Nakamura et al. | 156/584 |
| 2009/0277591 A1 * | 11/2009 | Zhao et al. | 156/584 |
| 2011/0174445 A1 * | 7/2011 | Ciliberti et al. | 156/752 |

FOREIGN PATENT DOCUMENTS

| | | |
|---|---|---|
| JP | S62280143 A | 12/1987 |
| JP | H03288742 A | 12/1991 |
| JP | H1059543 A | 3/1998 |
| JP | 2000068172 A | 3/2000 |
| JP | 2009096604 A | 5/2009 |

OTHER PUBLICATIONS

Notification of Transmittal of the International Search Report and Written Opinion of the International Searching Authority for PCT/US2012/023930, mailed Jan. 22, 2014.

* cited by examiner

*Primary Examiner* — Mark A Osele
*Assistant Examiner* — Nickolas Harm
(74) *Attorney, Agent, or Firm* — Harness, Dickey & Pierce, P.L.C.

(57) ABSTRACT

Parts stuck together in a stack are separated by placing the parts in a vibratory apparatus and vibrating the stack of parts with a vibratory head of the vibratory apparatus to separate them and also constrain the parts with the vibratory head as the parts are vibrated.

9 Claims, 2 Drawing Sheets

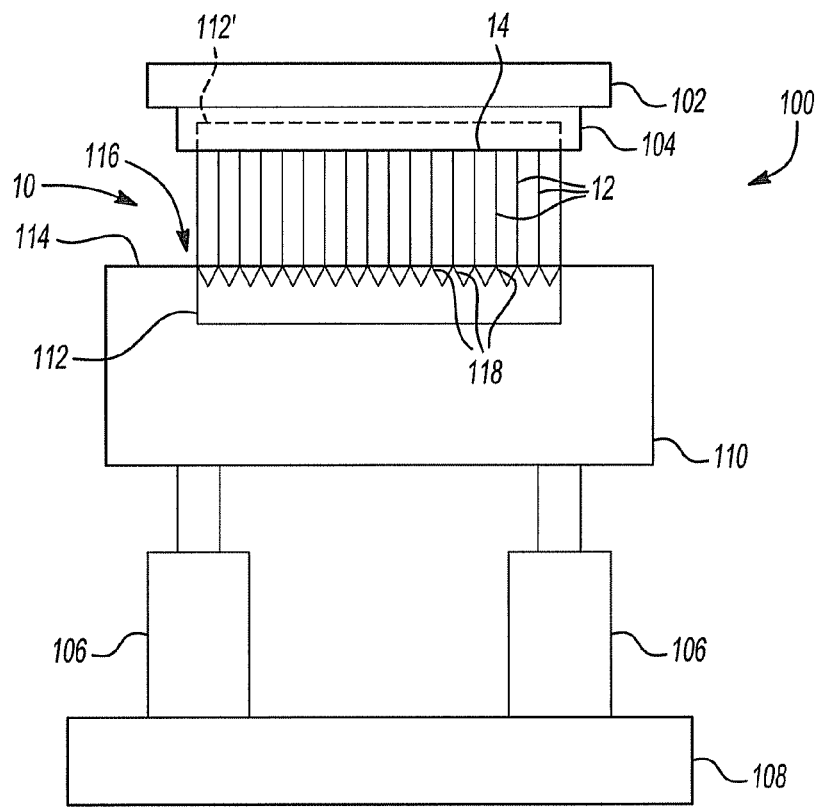
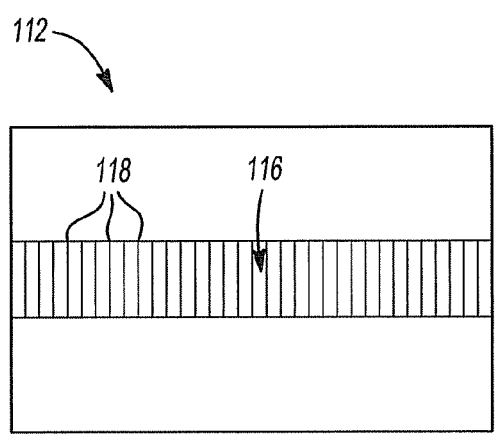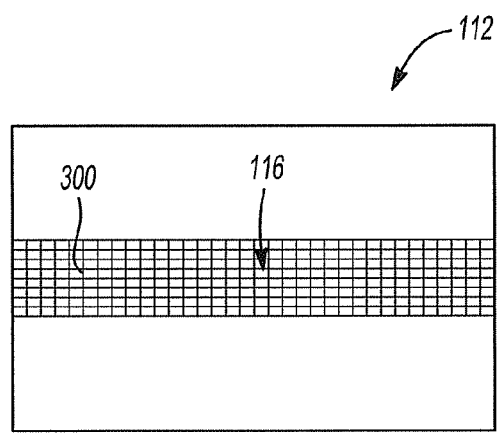

METHOD AND APPARATUS FOR SEPARATING LAMINATIONS

CROSS-REFERENCE TO RELATED APPLICATIONS

This application claims the benefit of U.S. Provisional Application No. 61/440,931, filed on Feb. 9, 2011. The entire disclosure of the above application is incorporated herein by reference.

FIELD

The present invention relates to separating parts that are stuck together.

BACKGROUND

In some manufacturing processes, parts may be processed during some operations and later be separated prior to use of a part in a product. These operations where the parts are processed together may result in the parts becoming stuck together. They may for example become stuck together in a stack after being stacked together and heat treated where the heat treating results in the parts being stuck together in the stack.

The parts must then be separated before being subsequently used such as in making a product that includes one or more of the parts. A typical method of separating parts stuck together such as in a stack of parts has involved hitting the stack of parts with a force sufficient to cause the parts to break apart from each other. For example, hitting the stack of parts with a rubber mallet, knocking the stack against a surface such as a table, or the like. Among others, this method presents ergonomic and scrap issues.

Some products are made, at least in part, by laminating. That is, a plurality of laminations are secured together. For example, stators used in electric motors are often made of laminations secured together. The laminations may be stamped from a sheet of ferromagnetic material, such as ferromagnetic steel or iron. Once the laminations for a stator are stamped, they are stacked (if not already stacked from the stamping operation), and heat treated. In this regard, the stack of laminations may include laminations for multiple stators. It should be understood that laminations may also be stuck together in a stack as a result of manufacturing processes other than heat treating and need to be separated before being laminated together. The laminations are then separated from each other by the application of manual force as described in above. In addition to the ergonomic and scrap issues that this method can present, it can cause some degradation in the ferromagnetic properties of the laminations

SUMMARY

In accordance with an aspect of the present disclosure, parts stuck together in a stack are separated by placing the parts in a vibratory apparatus and vibrating the stack of parts with a vibratory head of the vibratory apparatus to separate them and also constrain the parts with the vibratory head as the parts are vibrated.

In an aspect, the parts are laminations stacked together in a stack of laminations and vibrating the stack of laminations includes contacting the stack of laminations with a tool of a vibratory head of the vibratory apparatus that is vibrating to vibrate the parts and also constraining the parts with the tool as it vibrates the parts.

In an aspect, the stack of laminations is positioned on its side in the vibratory apparatus and a side of the stack of laminations is contacted with the tool.

In an aspect, the vibratory apparatus has a table having an anvil mounted therein on which the stack of laminations is positioned. The stack of laminations is positioned on its side on the anvil. A face of the anvil that contacts the stack of laminations has a series of edges running longitudinally therealong with each edge extending laterally across the anvil face. The edges grab the individual laminations when the stack of laminations is being vibrated to facilitate separation of the laminations. In an aspect, the series of edges is a series of serrations. In an aspect the series of serrations are saw tooth serrations. In an aspect, the series of edges is provided by the face of the anvil being knurled.

In an aspect, alternatively or in addition, the tool of the vibratory head has a series of edges running longitudinally therealong with each edge extending laterally across the tool face with the edges of the face of the tool grabbing the laminations when the stack of laminations is being vibrated to facilitate separation of the laminations.

In an aspect, the parts are a stack of disks stacked together. The stack of disks are placed in a vibratory apparatus and vibrated with a tool of a vibratory head of the vibratory apparatus and also constrained with the tool. In an aspect, the disks have a central bore. In an aspect, the tool has a shaft and placing the disks in the vibratory apparatus includes placing them on the shaft with the shaft extending through the central bores of the disks. Vibrating the disks includes vibrating the vibratory head to vibrate the shaft which vibrates the disks placed on the shaft.

In an aspect, the vibratory head vibrates at a frequency in the range of 60 Hz-320 Hz.

In an aspect, the vibratory head vibrates at ultrasonic frequencies. In an aspect, vibratory head vibrates at a frequency in the range of 10 kHz to 60 kHz.

BRIEF DESCRIPTION OF THE DRAWINGS

The present invention will become more fully understood from the detailed description and the accompanying drawings, wherein:

FIG. 1 shows a stack of laminations in a vibratory apparatus in accordance with an aspect of the present disclosure;

FIG. 2 shows an anvil tool for the vibratory apparatus of FIG. 1; and

FIG. 3 shows another anvil for the vibratory apparatus of FIG. 1;

DETAILED DESCRIPTION

Figure 4:
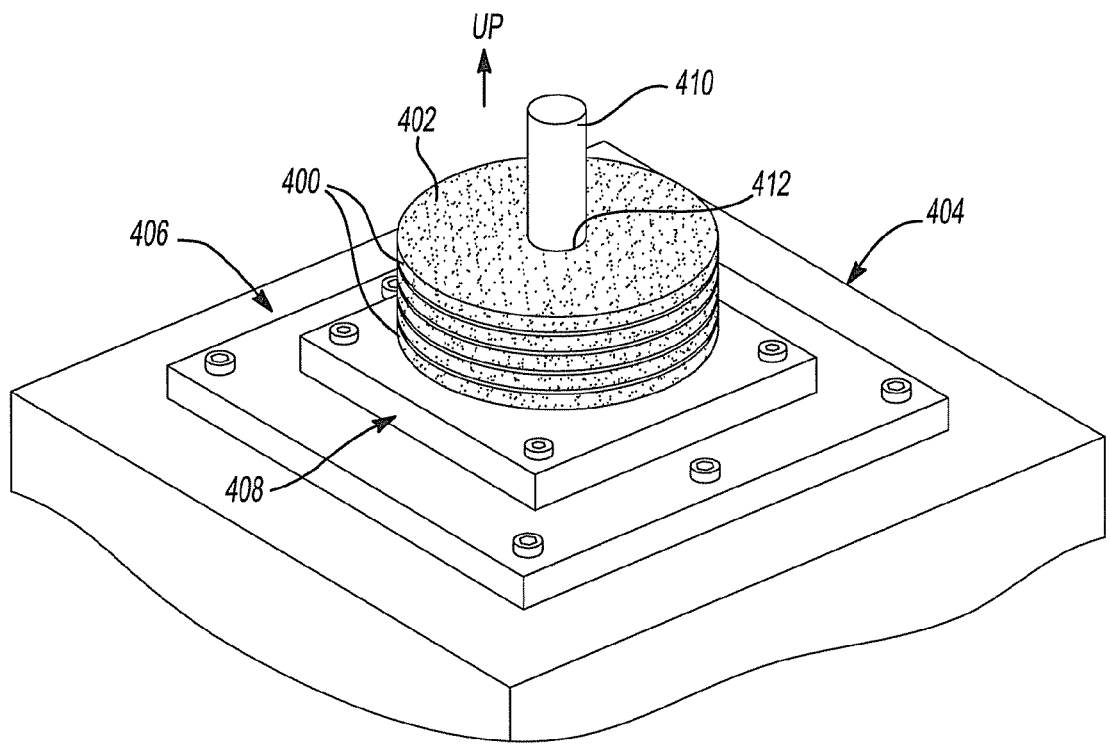
FIG. 4 shows a stack of disks in a vibratory apparatus in accordance with an aspect of the present disclosure.

The following description of the preferred embodiment(s) is merely exemplary in nature and is in no way intended to limit the invention, its application, or uses.

FIG. 1 shows a lamination stack 10 of laminations 12 positioned on its side in a vibratory apparatus 100. Lamination stack 10 is made up of a number of individual laminations 12 (only three of which are identified with lead lines to reference number 12) that are stacked together. When for example the laminations 12 are used to make stators for electrically motor, laminations 12 are heat treated after they have been stacked together in lamination stack 10. Due to the heat treatment, laminations 12 stick together as discussed above. It should be understood that laminations are used to make products other than stators for electric motors and can stick together in a stack for reasons other than heat treatment. Vibratory apparatus 100 may illustratively be an apparatus similar to a vibration welder, such as those described in U.S. Pat. No. 3,920,504 to Show et al. for "Friction Welding Apparatus," and U.S. Pat. No. 4,352,711 to Toth for "Friction Welding Apparatus," modified as discussed below.

Vibratory apparatus 100 includes a vibratory head 102 which may illustratively have a tool 104 that contacts a side 14 of lamination stack 10, thus contacting the individual laminations 12 and also constraining them as they are vibrated. Cylinders 106, which may be hydraulic, electric or pneumatic, are mounted on a base plate 108 and attached to a table 110.

In the illustrative embodiment shown in FIG. 1, lamination stack 10 is positioned on its side on table 110. Cylinders 106 move table 110 against vibratory head 102. Lamination stack 10 is pushed against vibratory head 102 with a force that is sufficient so that vibratory head 102 can vibrate lamination stack 10 to separate laminations 12 as well as constrain them, but is not sufficient to weld them together. It should be understood that vibratory apparatus 100 could alternatively be configured so that table 110 remains stationary and vibratory head 102 lowered to bring tool 104 into contact with side 14 of stack 10. It should also be understood that vibratory apparatus 100 could be configured so that lamination stack 10 is contacted by vibratory head 102 from a direction other than above stack 10, such as by way of example and not of limitation, from below stack 10.

An anvil 112 is mounted to top 114 of table 110, and may be recessed therein. Anvil 112 has a face 116 having a series of edges 118 spaced longitudinally therealong. Each edge 118 extends laterally across anvil face 116 as best shown in FIG. 2.

When lamination stack 10 is positioned on anvil 112, it extends longitudinally along anvil face 116 and edges 118 of anvil face 112 extend laterally across lamination stack 10. In the illustrative embodiment, each lamination 12 is annular (or quasi annular) and lamination stack 10 is thus cylindrical (or quasi cylindrical). Edges 118 thus extend across lamination stack 10 perpendicular to a longitudinal axis of lamination stack 10. When lamination stack 10 is vibrated by vibratory head 102, edges 118 will catch in gaps between edges (such as by projecting into the gaps) of adjacent laminations 12 in lamination stack 10 and in effect grab the laminations 12, which facilitates the separation of the laminations 12. This also has the effect of rifling the laminations 12 thus facilitating their separation.

The series of edges 118 may illustratively be a series of serrations, which may illustratively be a series of saw tooth serrations as shown in FIG. 1. The series of edges 118 may illustratively be provided by anvil face 116 having a knurled surface 300 as shown in FIG. 3. It should be understood that the foregoing are examples and are not exhaustive of how edges 118 may be provided. In this regard, edges 118 can be provided by forming anvil face 116 in any manner that provides edges that will engage with laminations 12 of stack 10, such as by projecting into gaps between edges of adjacent laminations 12. In this regard, it should be understood that each edge need not be a continuous edge but could for example be a series of points, fingers or the like, and may be provided by tool face 116 having a roughened surface.

It should be understood that the edges 118 may illustratively be determined based on the geometry of the laminations 12 in lamination stack 10 so that edges 118 optimally engage with the laminations 12 in stack 10. For example, the spacing of the edges 118 in anvil face 116 may illustratively correspond to the thickness of the laminations 12. That is adjacent edges 118 are spaced from each other a distance that is the same as the thickness of a lamination 12.

Tool 104 of vibratory head 102 may also include similar edges (tool 112', as shown in phantom in FIG. 1).

Illustratively, vibratory head 102 vibrates in the range of 60 Hz-320 Hz. It should be understood that these frequencies are exemplar and that vibratory head 102 can vibrate at other frequencies. In this regard, the optimum frequency can for example be heuristically determined and may differ depending the laminations and the degree to which the laminations 12 in lamination stack 10 stick together after heat treating.

It should also be understood that vibratory apparatus 100 could also be an ultrasonic vibratory apparatus, such as an ultrasonic welder, modified so that the horn of the ultrasonic apparatus, which would comprise vibratory head 102, contacts lamination stack 10 with sufficient force to vibrate the laminations 12 loose from each other as well as constrain them, but not enough force to weld them. A prior art ultrasonic welder that could be modified in this regard is disclosed in U.S. 2008/0054051 for Ultrasonic Welding Using Amplitude Profiling. In accordance with an aspect of the present disclosure, the vibratory head would illustratively vibrate at a frequency of about 10 kHz to 60 kHz.

Separating the laminations in a stack of laminations by contacting the stack with a vibratory head in accordance with the above (which may be referred to as "vibratory separated laminations") enhances the efficiency of the electric motor having a stator made with the vibratory separated laminations. Since the laminations in the stack of laminations are not being separated with the "breaking lam manually" approach, the laminations are not subjected to the type of abrupt force inherent in this approach. Thus, there is less degradation of the ferromagnetic properties of the laminations and core loss readings of stators made with the vibratory separated laminations are improved. Further, by constraining the parts with the vibratory head as they are being vibrated reduces the possibility of damaging the parts due to their bouncing around if unconstrained.

While the foregoing has been described in the context of separating laminations in a stack of laminations, it should be understood that a vibratory apparatus can be used in accordance with the above to separate other types of parts used in making products where a plurality of the parts are stuck together in some manner and need to be separated before being used to make the products.

As another example and not of limitation, with reference to FIG. 4, disks 400 in a stack 402 of disks 400 can be separated by placing the stack 402 of disks 400 in a vibratory apparatus 404 and vibrating the stack 402 of disks 400. In FIG. 4, vibratory apparatus 404 includes a vibratory head 406 having a tool 408. In the embodiment shown, tool 408 includes a vertical shaft 410. The stack 402 of disks 400 are placed on tool 408 with vertical shaft 410 extending through central bores 412 of disks 400. To separate disks 400 in stack 402, vibratory head 406 is vibrated by vibratory apparatus 404 resulting in shaft 410 vibrating. The disks 400 are in contact with the vibrating shaft 410 and the vibration causes the disks 400 in stack 402 to break apart from each other. Shaft 410 also constrains disks 400. Disks 400 may by way of example and not of limitation be grinding disks.

Figure 5:
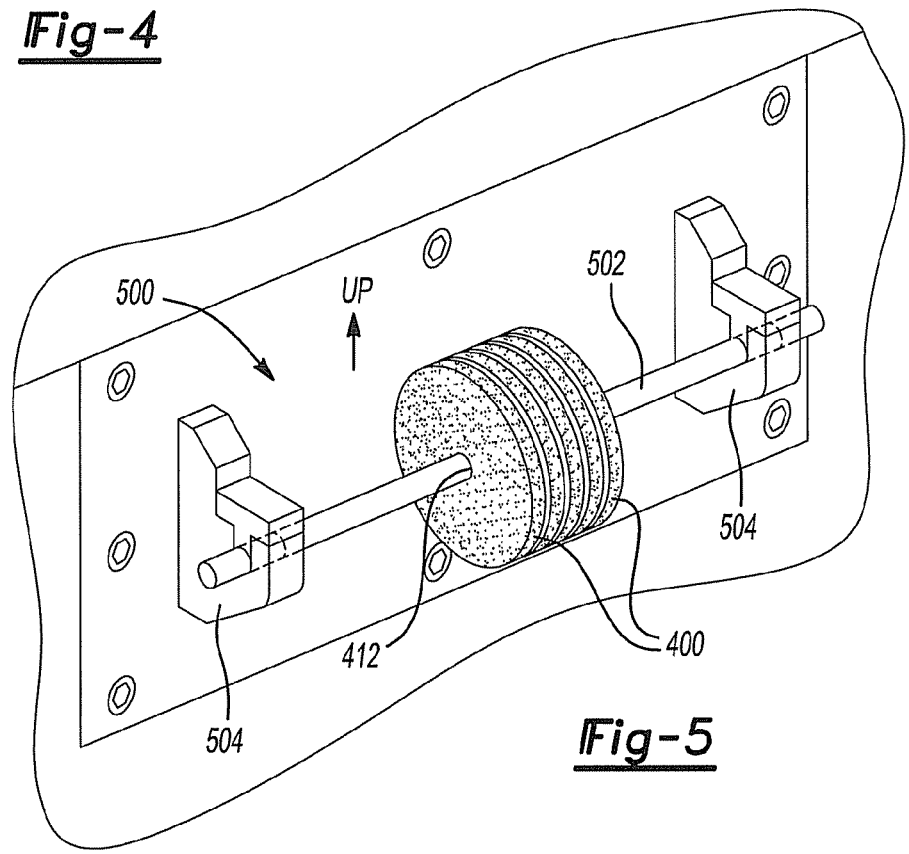
FIG. 5 shows a stack of disks in a vibratory apparatus in accordance with a variation of the aspect of FIG. 4.

FIG. 5 shows a variation of FIG. 5 wherein vibratory head 406 (FIG. 4) has tool 500 having a horizontal shaft 502. In the embodiment of FIG. 5, the stack 402 of disks 400 are placed on tool 500 with horizontal shaft 502 extending through central bores 412 of disks 400.

While in the above described aspects the stack of parts is constrained by the tool of the vibratory head contacting one surface of the stack of parts, it should be understood that the tool can contact more than one surface of the stack of parts to constrain them. By way of example and not of limitation, the aspect of FIG. 5, the stack 402 of disks 400 can also extend across the horizontal shaft 502 and be constrained by opposed brackets 504 that hold horizontal shaft 502.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of separating parts stuck together wherein each part is a lamination that is a stamping of ferromagnetic material and the laminations are stacked together in a stack of the laminations, comprising placing the parts in a vibratory apparatus and vibrating the parts with the vibratory apparatus including contacting the stack of laminations with the vibratory head of the vibratory apparatus and also constraining the parts with the vibratory head of the vibratory apparatus as the parts are vibrated.

2. The method of claim 1 wherein placing the stack of laminations in the vibratory apparatus includes placing the stack of laminations in the vibratory apparatus after the stack of laminations has been heat treated.

3. The method of claim 2 wherein the stack of laminations has a side and the method includes positioning the stack of laminations on its side in the vibratory apparatus and contacting the side of the stack of laminations with the vibrating vibratory head.

4. The method of claim 3 wherein positioning the lamination stack on its side in the vibratory apparatus includes positioning the lamination stack on its side on an anvil in a table of the vibratory apparatus wherein anvil has an anvil face having a series of edges spaced longitudinally therealong with each edge extending laterally across the anvil face, the method including rifling the laminations with the edges of the anvil face to facilitate the separation of the laminations with the edges of the anvil face catching in gaps between edges of adjacent laminations to rifle the laminations as the vibratory head vibrates.

5. The method of claim 4 wherein contacting the side of the lamination stack with the vibratory head includes contacting the side of the lamination stack with a tool of the vibratory head having a tool face with a series of edges spaced longitudinally therealong with each edge extending laterally across the tool face of the tool of the vibratory head, the method including rifling the laminations with the edges of the tool face to facilitate the separation of the laminations with the edges of the tool face of the tool of the vibratory head catching in gaps between edges of adjacent laminations of the lamination stack as the vibrating vibratory head vibrates to rifle the laminations.

6. The method of claim 3 wherein contacting the side of the lamination stack with the vibratory head includes contacting it with a tool of the vibratory head having a tool face with a series of edges spaced longitudinally therealong with each edge extending laterally across the tool face of the tool of the vibratory head, the method including rifling the laminations with the edges of the tool face of the tool of the vibratory head to facilitate the separation of the laminations with the edges of the tool face catching in gaps between edges of adjacent laminations of the lamination stack as the vibratory head vibrates against the lamination stack to rifle the laminations.

7. A method of separating individual laminations in a stack of laminations where adjacent laminations in the stack of laminations are stuck together and each lamination is a stamping of ferromagnetic material, comprising:

placing the stack of laminations on its side on an anvil in a table of a vibratory apparatus, the anvil having an anvil face having a series of edges spaced longitudinally therealong with each edge extending across the anvil face, the method including contacting the side of the stack of laminations with a vibrating vibratory head of the vibratory apparatus and rifling the laminations with the edges of the anvil face to facilitate the separations of the laminations with the edges of the anvil face catching in gaps between edges of adjacent laminations as the vibratory head vibrates against the lamination stack to rifle the laminations.

8. The method of claim 7 wherein contacting the side of the lamination stack with the vibratory head includes contacting the side of the lamination stack with a tool of the vibratory head having a tool face with a series of edges spaced longitudinally therealong with each edge extending laterally across the tool face of the tool of the vibratory head, the method including rifling the laminations with the edges of the tool face to facilitate the separation of the laminations with the edges of the tool face of the tool of the vibratory head catching in gaps between edges of adjacent laminations of the lamination stack as the vibrating vibratory head vibrates against the lamination stack to rifle the laminations.

9. A method of separating individual laminations in a stack of laminations where adjacent laminations in the stack of laminations are stuck together, comprising:

placing the stack of laminations on its side in a vibratory apparatus and contacting the side of the stack of laminations with a tool of a vibrating vibratory head of the vibratory apparatus, the tool having a tool face with a series of edges spaced longitudinally therealong with each edge extending laterally across the tool face of the tool of the vibratory head, wherein contacting the stack of laminations with the tool of the vibrating vibratory head includes rifling the laminations with the edges of the tool face catching in gaps between the edges of adjacent laminations as the vibrating vibratory head vibrates to rifle the laminations.

\* \* \* \* \*